(12) United States Patent
Roberts

(10) Patent No.: US 9,830,586 B2
(45) Date of Patent: Nov. 28, 2017

(54) ELECTRONIC PAYMENTS

(71) Applicant: NCR Corporation, Duluth, GA (US)

(72) Inventor: Drew Roberts, Baden (CA)

(73) Assignee: NCR Corporation, Duluth, GA (US)

( * ) Notice: Subject to any disclaimer, the term of this patent is extended or adjusted under 35 U.S.C. 154(b) by 763 days.

(21) Appl. No.: 14/230,541

(22) Filed: Mar. 31, 2014

(65) Prior Publication Data

US 2015/0278793 A1 Oct. 1, 2015

(51) Int. Cl.
*G06Q 40/00* (2012.01)
*G06Q 20/22* (2012.01)
*G06Q 20/10* (2012.01)

(52) U.S. Cl.
CPC .......... *G06Q 20/22* (2013.01); *G06Q 20/102* (2013.01)

(58) Field of Classification Search
CPC .... G06C 40/00; G06C 40/025; G06C 20/102; G06C 20/108; G06C 20/40; G06C 20/042
USPC ...................... 705/35, 38, 40, 42, 43, 44, 45
See application file for complete search history.

(56) References Cited

U.S. PATENT DOCUMENTS

| | | | | |
|---|---|---|---|---|
| 7,885,451 B1 * | 2/2011 | Walls | ..................... | G06Q 20/04 235/379 |
| 7,970,677 B1 * | 6/2011 | Oakes, III | ............ | G06Q 20/108 235/382 |
| 8,699,779 B1 * | 4/2014 | Prasad | ..................... | G06K 9/32 382/137 |
| 8,779,147 B2 * | 7/2014 | Berdini | .............. | A61K 31/4152 546/211 |
| 8,996,476 B2 * | 3/2015 | Williams | ................ | G06F 17/30 235/379 |
| 2005/0171899 A1 * | 8/2005 | Dunn | ..................... | G06Q 20/02 705/39 |
| 2006/0106717 A1 * | 5/2006 | Randle | ................... | G06Q 20/04 705/45 |
| 2007/0130063 A1 * | 6/2007 | Jindia | .................... | G06Q 20/10 705/39 |
| 2008/0262954 A1 * | 10/2008 | Nally | ..................... | G06Q 20/02 705/35 |
| 2010/0161466 A1 * | 6/2010 | Gilder | .................... | G06Q 20/04 705/34 |
| 2012/0109825 A1 * | 5/2012 | Haschka | .............. | G06Q 20/042 705/45 |
| 2013/0085935 A1 * | 4/2013 | Nepomniachtchi | .. | G06Q 20/322 705/40 |
| 2013/0097076 A1 * | 4/2013 | Love | .................. | G06Q 20/0425 705/42 |
| 2013/0117183 A1 * | 5/2013 | Bozeman | ............... | G06Q 20/04 705/44 |
| 2013/0223721 A1 * | 8/2013 | Nepomniachtchi | | G06K 9/00536 382/138 |
| 2014/0052621 A1 * | 2/2014 | Love | ..................... | G06Q 20/26 705/39 |
| 2014/0052697 A1 * | 2/2014 | Williams | ................ | G06F 17/30 707/691 |

(Continued)

*Primary Examiner* — Lalita M Hamilton
(74) *Attorney, Agent, or Firm* — Schwegman, Lundberg & Woessner

(57) ABSTRACT

A template version of check information is obtained and an image of a check produced from the template for a transaction of a payor. The image is transmitted to a payee and the payee uses the image to electronically deposit the image for payment with the payee's financial institution as if the image came from a physical check obtained from the payor.

15 Claims, 4 Drawing Sheets

(56) References Cited

U.S. PATENT DOCUMENTS

2014/0279310 A1\* 9/2014 Fossella ............... G06Q 40/12
705/30

\* cited by examiner

ELECTRONIC PAYMENTS

BACKGROUND

A variety of laws regulate the banking industry and in particular how banks handle check payments versus electronic payments or fund transfers.

A well-known law for processing checks in the United States is known as the Check Clearing for the 21$^{st}$ Century Action (popularly referred to as "Check 21.") A recipient of a paper check is permitted to create a digital version of the original check (referred to as "check truncation.") The new electronic image is called a "substitute check." This has largely been a success because the physical handling, managing, and storing of a huge volume of checks that banks are forced to process have almost entirely been eliminated. Now, consumers, banks, and businesses that receive checks can capture images of those checks and process check payments electronically using those images.

Different rules and regulations apply to electronic fund transfers. Regulation CC associated with the Expedited Funds Availability Action (EFA or EFAA) regulates how long banks can hold certain electronic fund payments.

Because banking has steadily been moving to electronic transactions, vendors that handle electronic check images and physical checks on behalf of banks have been in search of a mechanism to provide a better way to gain traction with a traditional check, which could be processed using existing Check 21 infrastructure but utilize Regulation CC.

At present Check 21 relies on an image of a physical check, such that the check processing squarely falls within the purview of the laws are regulations associated with Check 21. But, as stated the use and popularity of physical checks are in steady decline within the industry.

SUMMARY

In various embodiments, techniques for streamlining and processing electronic payments are presented.

According to an embodiment account data for a payor is obtained and the account data is retained for check image generation associated with a transaction of the payor.

DETAILED DESCRIPTION

Figure 1A:
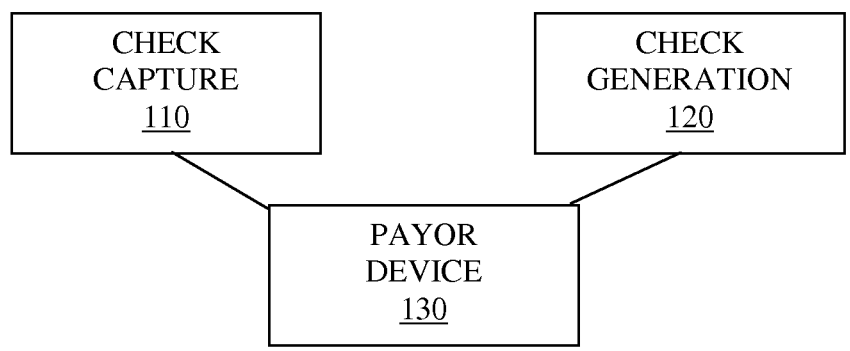
FIG. 1A is a diagram depicting check capturing, check generation, and check distribution, according to an example embodiment.

FIG. 1A is a diagram depicting check capturing, check generation, and check distribution, according to an example embodiment. It is noted that the components of the FIG. 1A are presented in greatly simplified form and are presented for purposes of illustrating and comprehending various embodiments of the invention. Thus, other components may exist as well.

Traditionally, for Check 21 processing the actual physical check for a transaction needs to be imaged and this image is used as a substitute check that can then be processed for payment and governmental compliance through existing payment infrastructures by using and retaining the image (substitute check), rather than the actual physical check.

As will be discussed more completely herein and below, the actual physical check can be dispensed with for check payment and processing, but the existing Check 21 payment processing infrastructure (or an enhanced version (as discussed herein and below)) can still be utilized to comply with Check 21.

Initially, an electronic template for a consumer's check is produced. This can be achieved in one of two manners. First, a check capture process 110 can be used that takes an image of a consumer's blank check. The purpose of the taking the image is to electronically capture, in digital form, the check's Magnetic Ink Character Recognition (MICR) information (e.g., country routing number, bank routing number, customer account number, etc.). This provides electronic information for obtaining payment from the payor's bank and the payor's account with that bank. In an embodiment, the check capture process 110 can also be used to capture a signature of the consumer (payor) present on the blank check.

The check capture process 110 can be executed on a variety of devices, such as a server associated with the consumer's bank, a vendor that handles check processing for the bank, a mobile device of the consumer (utilizing a mobile application distributed from the bank or the vendor), and/or a website. The image of the blank check can be provided by the consumer and captured utilizing any scanning or imaging device accessible to the consumer (in the case where the check capture process 110 executes on a mobile application, the image can be captured by the camera of the mobile device and automatically supplied to the mobile application for processing).

The second manner is to use a check generation process 120, which utilizes previously electronic stored information for the consumer's checking account (such as the MICR information) and, optionally, a previously stored image of a signature for the consumer to create the template check (or truncated check compliant with Check 21).

The check generation process 120 can also be executed on a variety of devices, such as a server associated with the consumer's bank, a vendor server that handles check processing for the bank, a mobile device of the consumer (utilizing a mobile application distributed from the bank or the vendor), and/or a website. In an embodiment, a mobile application distributed to the consumer interacts with a bank server or bank vendor server to obtain the MICR information for the template in an automated fashion and, optionally, to obtain an image on file for the consumer's signature. In an embodiment, a website application associated with the bank or vendor supplies the MICR information for the template in an automated fashion on an as needed basis for transactions of the consumer.

It is also noted that when the check generation process 120 is used, it may be unnecessary to have a template because the needed MICR information can be dynamically generated on a per-transaction basis for the consumer.

Once the MICR information is known and recorded (and optionally the payor's signature), the payor device 130 can use that information (as a template or generated on a per transaction basis) to make payments to payees for transactions that the consumer engages in. This occurs without the need for the payee to receive a physical check and without the need for the payor to physically transcribe a check that is delivered to the payee as payment.

The payor device 130 can include any number of devices accessible to the payor, such as but not limited to: a phone, a tablet, a laptop, a desktop, a wearable processing device (smart glasses, smart watch, etc.), and others.

Figure 1B:
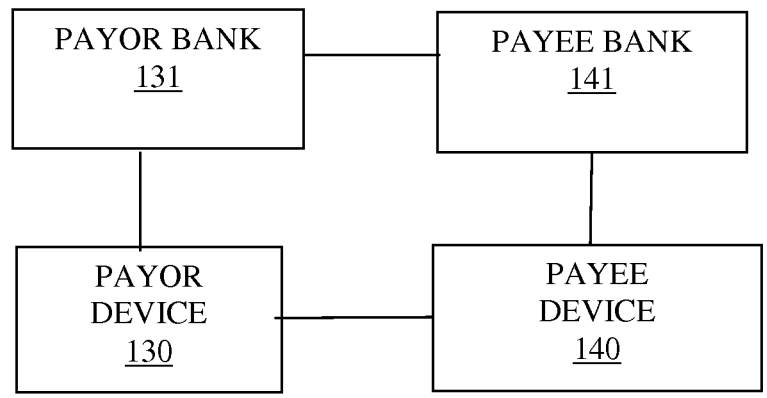
FIG. 1B is a diagram depicting automated check payment and processing, according to an example.

FIG. 1B is a diagram depicting automated check payment and processing, according to an example.

The payment processing includes four components.

First, the payor utilizes the payor device 130 and obtains an electronic check. The electronic check can be obtained in a number of manners.

For example, a mobile application on the payor device 130 can utilize the template (discussed above) or automatically generate a template using previously acquired or dynamically acquired payor MICR information; the template is populated with transaction details related to a transaction of the payor, such as payee name, transaction amount, date, memo details, etc. This forms a modified image that represents a physical check but the physical check does not exist. Essentially, a check compliant with Check 21 (including all information needed for a truncated check) is automatically produced based on transaction details (entered by the payor through an interface of the mobile application) and the template (or automatically obtained payor MICR information).

As another example, the payor device 130 is a website that interacts or is controlled by the payor bank 130 or a vendor of the payor bank 130. Here, an interface of the website is used by the payor to enter the transaction details and the template (or automatically obtained payor MICR information) is used to create an image of a check compliant with Check 21.

Once a check 21-compliant truncated check is produced for the payee from the payor, the payor can use a variety of mechanisms to transmit the electronic check to a payee device 140 of the payee for the electronic check. Such transfer of the electronic check from the payor device 130 to the payee device 140 can occur in a variety of manners.

For example, the payor device 130 and payee device 140 can use a Near Field Communication (NFC) electronic check transfer by tapping the two devices against each other. Other wireless transfers can occur as well between the devices 130 and 140, such as, but not limited to Infrared (IR), Bluetooth, Low Energy Bluetooth, WiFi, etc.

The payor may also use the payor device 130 to email or text the electronic check to an address or phone number associated with the payee, which the payee accesses via the payee device 140.

In still another case, the payor can cause a Quick Response (QR) code representing the check to be displayed from a display of the payor device 130 that the payee acquires using a camera of the payee device 140 from the display of the payor device 130. The QR code can also be posted to a website that the payee obtains via a camera of the payee device 140. Still further the QR code can be emailed or texted to the payor device 140.

In still another situation, the payor device 130 can initiate the transfer of the electronic check from a server (such as a website controlled by the bank or vendor of the bank) to a server associated with the payee (accessible to or used as the payee device 140).

In an embodiment, when the payee receives the electronic check, the payee may be required to accept the payment into a specific bank account associated with the payee bank 141.

Once the payee is in possession of the electronic check from the payor, the payee can deposit the electronic check using the payee bank 141 as a remote deposit using the payee's remote deposit application associated with the payee bank 141. The payment processing between the payee bank 141 and the payor bank 131 then proceeds utilizing each bank's existing Check 21 infrastructure processing.

In an embodiment, an image of a signature for the payee is inserted as a back image endorsement to the electronic check utilizing an application on the payee device 141. The two images, the electronic check and a backside image having the payee endorsed signature image are then sent to the payee bank 141 as a remote deposit using the payee's remote deposit application associated with the payee bank 141.

In an embodiment, the processing associated with generating the template (or transactional-based MICR information) for creating an electronic check compliant with Check 21 (truncated check image) is transparent to the payee and payor. That is, the processing occurs in the background requiring no knowledge or additional input from the payee and payor beyond the transaction details. Here, the transparency can be achieved via mobile applications (or website applications) that the payee and payor use to perform the payment transaction between one another.

It is also noted that the payor bank 131 can process the electronic check received from the payee bank 141 utilizing its existing Check 21 infrastructure as an image cash letter or return item.

In an embodiment, the payment of the electronic check is alternatively processed as an immediate or expedited funds availability check payment, as available with APTRA Passport™ check cashing product distributed by NCR® Corp., of Duluth, Ga. In this manner, the payment of the electronic check can effectively become a near instant Peer-to-Peer (P2P) electronic payment between the payee and payor.

In an embodiment, when the electronic check is generated for a given transaction, it can be generated with a unique serial number for the payor to act as a legitimate check number.

The teachings herein streamline traditional check payment transfer and processing by creating digital checks where the digital checks do not originate from a physical paper-based check. The electronic checks can then be transferred more freely for payment, similar to the benefits of virtual currencies but including all the safeguards of laws and regulations associated with check and electronic funds processing, which virtual currencies lack today. The teachings leverage the ubiquitous Check 21 technology infrastructure that banks and vendors are heavily dependent on and invested in and remove the remaining physical limitations that still exist current Check 21 compliance processing.

Figure 2:
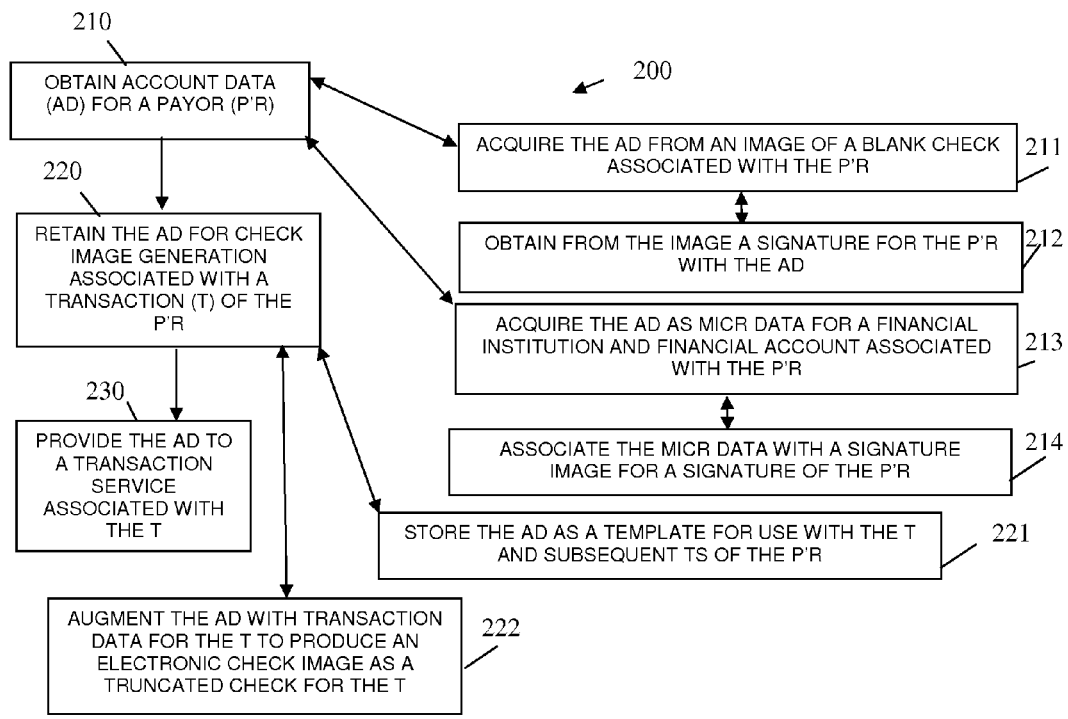
FIG. 2 is a diagram of a method for distributing a generic electronic check, according to an example embodiment.
Figure 3:
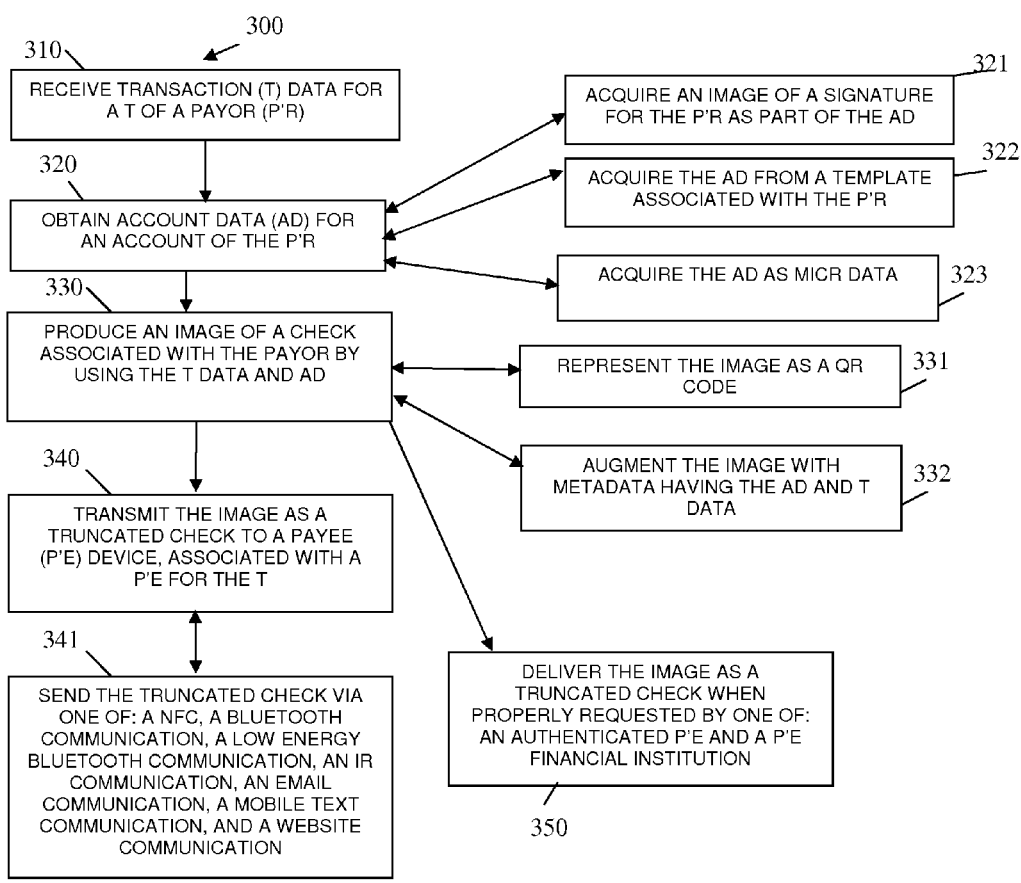
FIG. 3 is a diagram of a method for payment processing of a generic electronic check, according to an example embodiment.
Figure 4:
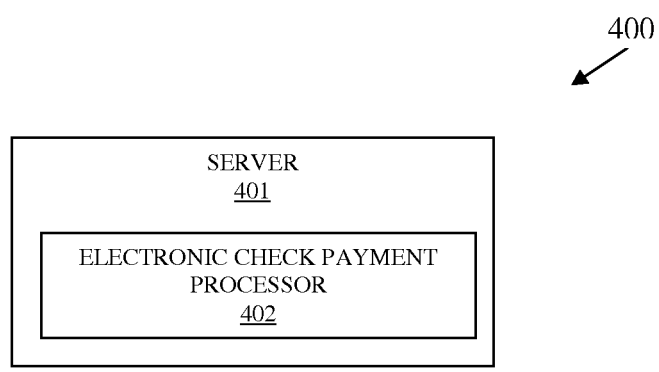
FIG. 4 is a diagram of an electronic payment system, according to an example embodiment.

Some additional embodiments and details and in some cases enhanced perspective of what has already been described are now presented with the discussion of the FIGS. 2-4.

FIG. 2 is a diagram of a method 200 for distributing a generic electronic check, according to an example embodiment. The software module(s) that implements the method 200 is referred to as an "electronic check distributor." The electronic check distributor is implemented as executable instructions programmed and residing within memory and/or a non-transitory computer-readable (processor-readable) storage medium and executed by one or more processors of a device. The processors of the device that execute the electronic check distributor are specifically configured and programmed to process the electronic check distributor. The electronic check distributor has access to one or more networks during its processing. The networks can be wired, wireless, or a combination of wired and wireless.

In an embodiment, the device that executes the electronic check distributor is an Automated Teller Machine (ATM).

In an embodiment, the device that executes the electronic check distributor is a server associated with a financial institution or a vendor of the financial institution.

The electronic check distributor is responsible for initially capturing an image of a blank physical check or creating an image from known information that would typically be required for a valid physical check (the image created without any physical check being processed).

At 210, the electronic check distributor obtains account data for a payor. This can occur in a variety of manners. Furthermore, the account data minimally includes an identifier for a financial institution of the payor and an identifier for a checking account of the payor with that financial institution.

According to an embodiment, at 211, the electronic check distributor acquires the account data from an image of a blank check associated with the payor. The image can be taken by any image capturing device or device having image capturing capabilities.

In an embodiment of 211 and at 212, the electronic check distributor obtains from the image a signature for the payor with the account data. So, the payor signs a blank check and uses an image capture device to capture that blank image with signature to supply manually or automatically (via a mobile application or website service) supply the blank check image to the electronic check distributor.

In an embodiment, at 213, the electronic check distributor acquires the account data as MICR data for a financial institution and financial account associated with the payor. So, the MICR data can be generated on behalf of the payor by the electronic check distributor (by acquiring it from the financial institution or profile of the payor) or can be obtained from the blank check image discussed in 211-212.

In an embodiment of 213 and at 214, the electronic check distributor associates the MICR data with a signature image for a signature of the payor. Here, the payor may have a signature in a profile or available to the electronic check distributor through the financial institution of the payor to which the electronic check distributor has access to.

At 220, the electronic check distributor retains the account data for check image generation associated with a transaction of the payor. That is, the account data only has to be acquired once for the payor and can be continually used for the transaction and reused for other transactions of the payor.

In an embodiment, at 221, the electronic check distributor stores the account data, and, optionally, the image of the payor's signature as a template for use with the transaction and subsequent transactions of the payor. This was discussed above with reference to the FIGS. 1A-1B.

In an embodiment, at 222, the electronic check distributor augments the AD with transaction data for the transaction to produce an electronic check image as a truncated check for the transaction. The truncated check is compliant with Check 21. This can also generate a serial number for the truncated check serving as a check number for the checking account of the payor.

According to an embodiment, at 230, the electronic check distributor provides the account data to a transaction service associated with the transaction. This can be delivery to a mobile application of a mobile device or delivery to a server-based application (the transaction service is the mobile application or the server-based application).

FIG. 3 is a diagram of a method 300 for payment processing of a generic electronic check, according to an example embodiment. The software module(s) that implements the method 300 is referred to as an "electronic check payment processor." The electronic check payment processor is implemented as executable instructions programmed and residing within memory and/or a non-transitory computer-readable (processor-readable) storage medium and executed by one or more processors of one or more devices. The processors of the devices that execute the electronic check payment processor are specifically configured and programmed to process the electronic check payment processor. The electronic check payment processor has access to one or more networks during its processing. The networks can be wired, wireless, or a combination of wired and wireless.

In an embodiment, the device that processes the electronic check payment processor is a financial institution payment server or a vender server that handles or assists the financial institution in payment processing.

At 310, the electronic check payment processor receives transaction data for a transaction of a payor. This transaction data can include, by way of example only, a current date, a current amount for the transaction, a name of a payee for the transaction, memo details desired by the payor, and the like.

At 320, the electronic check payment processor obtains account data for an account of the payor.

In an embodiment, at 321, the electronic check payment processor acquires an image of a signature for the payor as part of the account data.

In an embodiment, at 322, the electronic check payment processor acquires the account data from a template associated with the payor (as discussed above).

In an embodiment, at 323, the electronic check payment processor acquires the account data as MICR data.

At 330, the electronic check payment processor produces an image of a check associated with the payor by using the account data and the transaction data. So, an image of a check is produced without having a physical check.

In an embodiment, at 331 the electronic check payment processor 402 represents or encodes the image as a QR code.

In an embodiment, at 332, the electronic check payment processor 402 augments the image with metadata having the account data and the transaction data. The metadata can provide the electronic data to subsequent payment processing services to avoid image recognition on the image. This would entail enhancing payment processing techniques currently done by financial institutions for electronic processing.

According to an embodiment, at 340, the electronic check payment processor transmits the image as a truncated check (Check 21 compliant) to a payee device associated with a payee for the transaction. This can be done in a variety of manners.

For example, at 341, the electronic check payment processor can send the truncated via one of: NFC, Bluetooth, Low Energy Blue Tooth, IR, Radio Frequency (RF), WiFi, email, mobile text message, and a website communication.

In an embodiment, at 350, the electronic check payment processor delivers the image as a truncated check when properly requested by one of: an authenticated payee and a payee financial institution. So, delivery can be pushed as discussed at 340-341 or delivery can be pulled as presented here in 350.

FIG. 4 is a diagram of an electronic payment system 400, according to an example embodiment. The electronic payment system 400 includes a software module(s) programmed and residing within memory and/or a non-transitory computer-readable medium and that execute on one or more processors of a server. The electronic payment system 400 has access and can communicate over one or more networks; and the networks can be wired, wireless, or a combination of wired and wireless.

The electronic payment system 400 includes a server 401 and an electronic check payment processor 402.

The server 401 includes memory, storage, one or more processors, and other hardware and software assets.

The electronic check payment processor 402 is implemented as one or more software modules that execute on one or more processors of a device.

In an embodiment, the electronic check payment processor 402 executes on the server 401.

In an embodiment, the electronic check payment processor 402 executes as a mobile application on a mobile device of a payor and/or payee.

The electronic check payment processor 402 is configured and adapted to: produce an electronic check image from account data associated with a payor and transaction data associated with a transaction of the payor. The electronic check payment processor 402 is also configured and adapted to provide the electronic check image as a truncated check (Check 21 compliant) for payment processing associated with the transaction.

In an embodiment, the electronic check payment processor 402 is provided as a website service from the server 401.

In an embodiment, the electronic check payment processor 402 is distributed from the server 401 as a mobile application to a mobile device associated with the payor.

One now appreciates how existing check 21 infrastructures can be leveraged to perform automated payment processing through the capturing or generating of generic checks that are populated on a transaction basis with payment details images representing an "electronic checks." The electronic checks then normally processed by backend electronic payment systems.

It should be appreciated that where software is described in a particular form (such as a component or module) this is merely to aid understanding and is not intended to limit how software that implements those functions may be architected or structured. For example, some modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining, by an electronic check distributor executing on a device, account data for a payor, wherein obtaining further includes acquiring the account data as Magnetic Ink Character Recognition (MICR) data for a financial institution and financial account associated with the payor;
   retaining, by the electronic check distributor, the account data for check image generation associated with a transaction of the payor, and wherein retaining further includes augmenting the account data with transaction data for the transaction and producing an electronic check image as a truncated check for the transaction, and wherein retaining further includes creating multiple subsequent truncated checks from the retained account data for payments by the payor in subsequent transactions of the payor having other transaction data.

2. The method of claim 1, wherein acquiring further includes associating the MICR data with a signature image for a signature of the payor.

3. The method of claim 1, wherein retaining further includes storing the account data as a template for use with the transaction and subsequent transactions of the payor.

4. The method of claim 1 further comprising, providing, by the electronic check distributor, the account data to a transaction service associated with the transaction.

5. A method, comprising:
   receiving, by an electronic check payment processor executing on a device, transaction data for a transaction of a payor; and
   obtaining, by the electronic check payment processor, account data for an account of the payor;
   producing, by the electronic check payment processor, an image of a check associated with the payor by using the transaction data and the account data;
   transmitting, by the electronic check payment processor, the image as a truncated check to a payee device associated with a payee for the transaction; and
   subsequently producing, by the electronic check payment processor, subsequent images representing subsequent truncated checks from the account data having other transaction data for transmitting on behalf of the payee to subsequent payees for subsequent transactions of the payor.

6. The method of claim 5, wherein transmitting further includes sending the truncated check via one of: a Near Field Communication (NFC), a Bluetooth communication, a Low Energy Bluetooth communication, a Radio Frequency communication, an Infrared communication, an email communication, a mobile textcommunication, and a website communication.

7. The method of claim 5 further comprising, delivering, by the electronic check payment processor, the truncated check when properly requested by one of: an authenticated payee and a payee financial institution.

8. The method of claim 5, wherein obtaining further includes acquiring an image of a signature for the payor as part of the account data.

9. The method of claim 5, wherein obtaining further include acquiring the account data from a template associated with the payor.

10. The method of claim 5, wherein obtaining further includes acquiring the account data as Magnetic Ink Character Recognition (MICR) data.

11. The method of claim 5, wherein producing further includes representing the image as a Quick Response (QR) code.

12. The method of claim 5, wherein producing further includes augmenting the image with metadata having the account data and transaction data.

13. A system, comprising: a server; and
   an electronic check payment processor operable to (i) produce an electronic check image from account data associated with a payor and transaction data associated with a transaction of the payor, (ii) provide the electronic check image as a truncated check for payment processing associated with the transaction, and (iv) subsequently produce additional electronic checks from the account data for providing as payment processing for subsequent transactions having other transaction data on behalf of the payor.

14. The system of claim 13, wherein the electronic check payment processor is provided as a website service from the server.

15. The system of claim 13, wherein the electronic check payment processor is distributed from the server as a mobile application to a mobile device associated with the payor.

\* \* \* \* \*